(12) United States Patent
Klein et al.

(10) Patent No.: US 12,174,679 B2
(45) Date of Patent: Dec. 24, 2024

(54) ADAPTIVE CURRENT OFFSET CALIBRATION ADJUSTMENT

(71) Applicant: Dell Products L.P., Round Rock, TX (US)

(72) Inventors: Craig Anthony Klein, Elgin, TX (US); Doug E. Messick, Austin, TX (US); John Erven Jenne, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 17/944,710

(22) Filed: Sep. 14, 2022

(65) Prior Publication Data

US 2024/0085963 A1    Mar. 14, 2024

(51) Int. Cl.
*G06F 1/28* (2006.01)
*G06F 1/3296* (2019.01)
*G06F 11/30* (2006.01)

(52) U.S. Cl.
CPC .............. *G06F 1/28* (2013.01); *G06F 1/3296* (2013.01); *G06F 11/3024* (2013.01); *G06F 11/3062* (2013.01); *G06F 11/3065* (2013.01); *G06F 11/3089* (2013.01)

(58) Field of Classification Search
CPC ...... G06F 1/28; G06F 1/3296; G06F 11/3024; G06F 11/3062; G06F 11/3065; G06F 11/3089
See application file for complete search history.

(56) References Cited

U.S. PATENT DOCUMENTS

| | | | |
|---|---|---|---|
| 9,625,985 B2 | 4/2017 | Jenne | |
| 10,635,146 B2 | 4/2020 | Jenne et al. | |
| 2013/0339777 A1* | 12/2013 | Varma | G06F 1/26 713/340 |
| 2017/0300398 A1 | 10/2017 | Luo et al. | |

FOREIGN PATENT DOCUMENTS

CN    107817460 A  *  3/2018  ........... G01R 35/005

OTHER PUBLICATIONS

CN 107817460 with machine translation (Year: 2018).*

* cited by examiner

*Primary Examiner* — Glenn A. Auve
(74) *Attorney, Agent, or Firm* — Larson Newman, LLP

(57) ABSTRACT

An information handling system polls telemetry data from sensors associated with a central processing unit, and determines current offsets for each one of the sensors based on the telemetry data. The system may also determine a domain current offset associated with a calibration domain, determine a voltage regulator offset based on the domain current offset, and adjust power provided by the voltage regulator to the central processing unit based on the voltage regulator offset.

20 Claims, 7 Drawing Sheets

ADAPTIVE CURRENT OFFSET CALIBRATION ADJUSTMENT

FIELD OF THE DISCLOSURE

The present disclosure generally relates to information handling systems, and more particularly relates to adaptive current offset calibration adjustment.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system determines current offsets for sensors based on telemetry data, and determines a domain current offset associated with a calibration domain. The system may also determine a voltage regulator offset based on the domain current offset, and adjust power provided by the voltage regulator to the central processing unit based on the voltage regulator offset.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
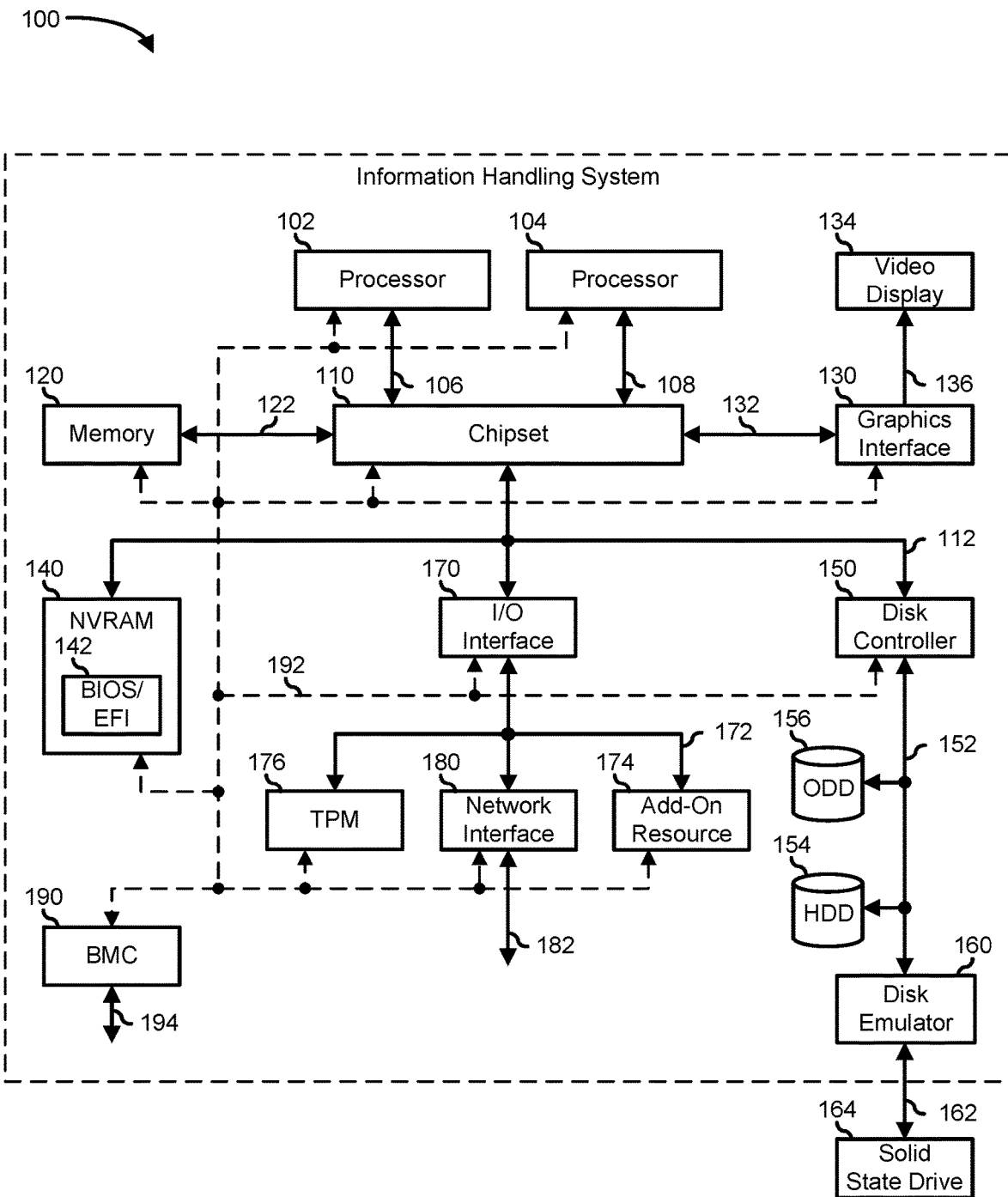
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth© or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Manufacturers of processors such as processors 102 and 104 typically use a static programmable current reporting offset in a voltage regulator to under-report the amount of current the processor(s) are consuming. This feature increases the power and performance of the processor(s) when running processor-intensive workloads. For example, Intel® uses a static "VR_Offset" as the current reporting offset of its voltage regulators. The current reporting offset, simply referred to herein as a current offset, maximizes performance within the thermal headroom of a worst-case configuration and environment. However currently there is no mechanism to make use of additional thermal headroom when the configuration and environment are not in the worst-case scenario, wherein instead of a static current offset, an adaptive current offset that changes value based on the configuration, environment, and the current scenario. To address this and other issues, the present disclosure provides a system and method to make use of the additional headroom even if the configuration and environment are not in the worst-case scenario.

Figure 2:
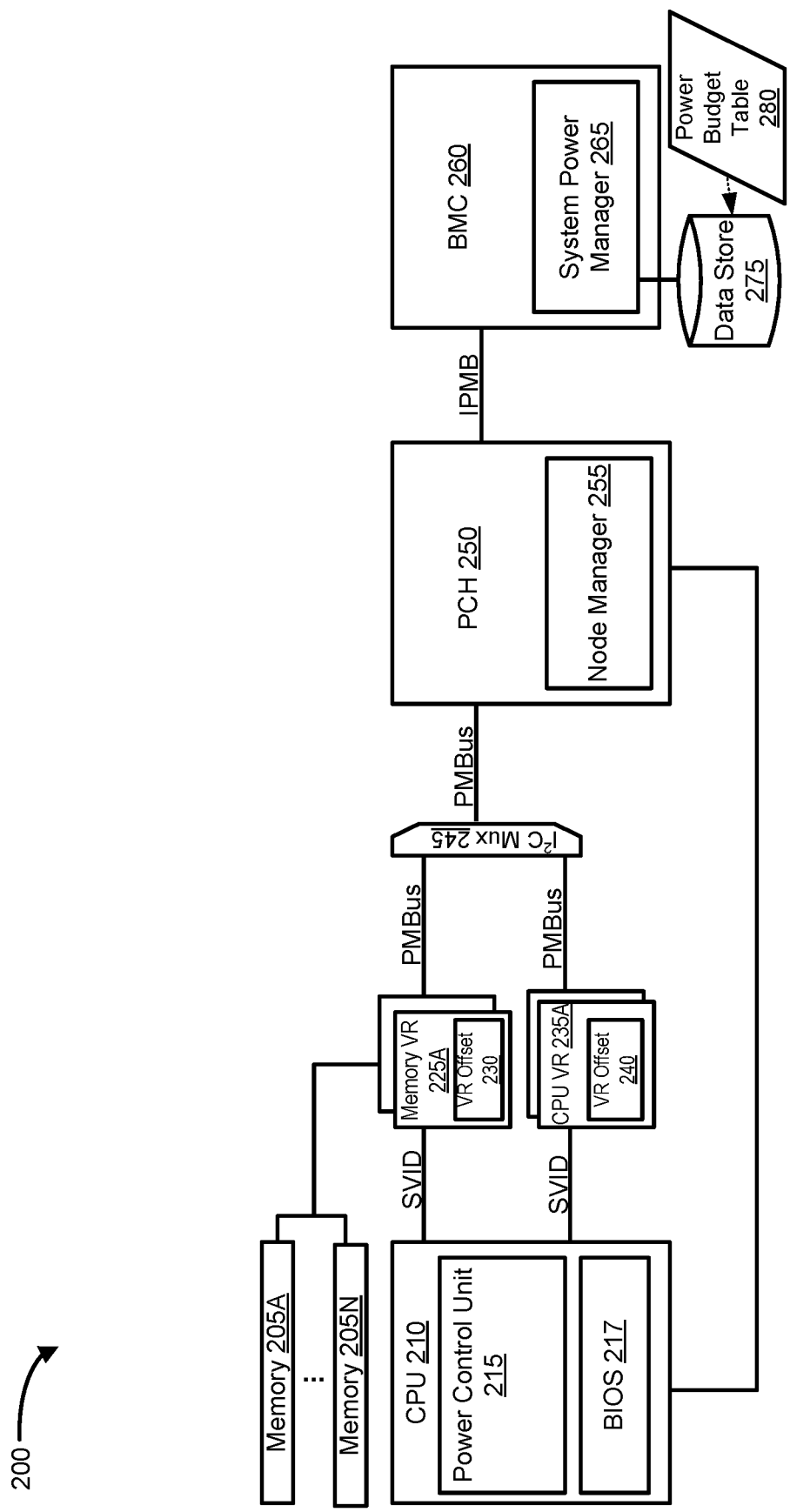
FIG. 2 is a block diagram illustrating a system for adaptive current monitor calibration adjustment, according to an embodiment of the present disclosure.

FIG. 2 shows a system 200 for adaptive current monitor calibration adjustment used to enhance the performance of an information handling system. System 200 includes memories 205A-205N, a CPU 210, memory voltage regulators 225A-225N, CPU voltage regulators 235A-235N, an I²C multiplexer 245, a platform controller hub (PCH) 250, and a BMC 260. Memories 205A-205N may be referred to herein as memories 205 or a memory 205. Memory voltage regulators 225A-225 may be referred to herein as memory voltage regulators 225 or a memory voltage regulator 225. Similarly, CPU voltage regulators 235A-235N may also be referred to herein as CPU voltage regulators 235 or a CPU voltage regulator 235.

Although in this example, system 200 includes a single processor, CPU 210, system 200 may include more than one processor. Each of the CPUs, also referred to herein as processors, in system 200 may be coupled to a memory voltage regulator and CPU voltage regulator. In this example, CPU 210 is communicatively coupled to memory voltage regulators 225 and CPU voltage regulators 235 via serial voltage identification (SVID) lines. Memory voltage regulators 235 provide a supply of voltage to CPU 210 and memories 205 while CPU voltage regulators 235 provide power to CPU 210. Memories 205 may be similar to memory 120 of FIG. 1. Both CPU voltage regulator 235 and memory voltage regulator 225 are coupled to I$^2$C multiplexer 245 via a PMBus. I2C multiplexer 245 is also coupled to PCH 250 via a PMBus. PCH 250 is communicatively coupled to BMC 260 via an intelligent platform management bus.

CPU 210 may include any system, device, or apparatus operable to interpret and/or execute program instructions and/or process data, and may include without limitation a microprocessor, microcontroller, digital signal processor, application-specific integrated circuit (ASIC), or any other digital or analog circuitry configured to interpret and/or execute program instructions and/or process data stored in the memory and/or another component of the information handling system. As such, CPU 210 also referred to herein as a processor, is similar to processor 102 and processor 104 of FIG. 1. CPU 210's rated frequency assumes that CPU 210 is running an application at a thermal design power. However, the thermal design power is typically underestimated which results in additional power and thermal headroom. To take advantage of the available power and thermal headroom, a current offset applied to the voltage regulators may be maximized.

CPU 210 includes a power control unit 215 which resides in a system agent of CPU 210 and is a combination of a hardware state machine and an integrated microcontroller. Power control unit 215 may be configured to collect telemetry information, such as power consumption, CPU utilization, and junction temperature. CPU 210 also includes a BIOS 217 which is similar to BIOS/EFI 142 of FIG. 2. The telemetry information collected by power control unit 215 may be transmitted or retrieved by node manager 255 and/or BMC 260. In addition, node manager 255 and/or BMC 260 may also retrieve settings and/or attributes from BIOS 217.

PCH 250 includes a node manager 225 which may be any hardware, software, firmware, and/or a combination thereof configured to manage certain performance aspects of the information handling system. In some embodiments, node manager 255 may be configured to analyze information received from other components of the information handling system. For example, node manager 255 may be configured to receive information regarding the current, historical, and/or analyzed data associated with other components of the information handling system. The information received by node manager 255 may be transmitted or retrieved by BMC 260.

In addition to system 200, the information handling system may also include a current monitor which can include one or more electronic component(s) configured to monitor the current associated with one or more other component(s) of the information handling system. The current monitor may be integrated into a monolithic power supply unit or maybe a discrete set of parts on a planer hot-swap controller. In some embodiments, the current monitor may include one or more local or remote components or features that may be configured to have one or more adjustable parameters that may be adjusted remotely. For example, the current monitor may include an adaptive current adjustment feature which may be implemented at BMC 260, which is similar to BMC 190 of FIG. 1.

The adaptive current offset adjustment feature is a closed loop algorithm that leverages the voltage regulator offsets, such as a voltage regulator offset 230 and a voltage regulator offset 240 associated with memory voltage regulators 225 and CPU voltage regulators 235 respectively. This feature allows an increase in the power and performance of CPU 210 by adjusting the value of voltage regulator offset 230 and voltage regulator offset 240 at each polling cycle. Voltage regulator offset 230 and voltage regulator offset 240 are variable current offsets applied to corresponding voltage regulator measurement associated with a processor that causes the operating performance level of that processor to be maximized.

The increase in performance is based on adapting the thermal headroom on a per-subsystem basis that is available in each system and environment. Multiple zones that include performance, adaptive, coast, etc. are implemented across multiple domains, such as thermal design, CPU utilization, power consumption, current limits, energy limits, performance per watt, power usage effectiveness, acoustics, input voltage, correctible errors, etc. Each domain includes a unique set of upper and lower limits wherein maximum, minimum, or variable current offset values may be based. The upper and lower limits may be adjusted on a per-platform basis via entries in power budget table 280.

For example, the adaptive calibration adjustment feature of current monitor 220 may maximize the value of the voltage regulator offset when the configuration and environment of the information handling system allow doing so. In addition, the said feature may gradually reduce the value of the voltage regulator offset when conditions approach various limits, such as upper or lower thermal/power limits. The voltage regulator offset may also be removed when CPU 210 is not heavily utilized to prevent unnecessarily increasing the power consumption of CPU 210. This allows CPU 210 to operate at a maximum performance within the thermal headroom of its configuration and environment while mitigating concerns, such as thermal considerations or unnecessarily reducing the performance per watt of power consumed by CPU 210 under a lighter workload.

In one embodiment, BMC 260 may be configured to receive or retrieve BIOS settings from BIOS 217. Based on the BIOS settings, BMC 260 may set a flag that shows the current state of the adaptive current monitor calibration adjustment feature. For example, BMC 260 may set the flag to zero or false if the adaptive current monitor calibration adjustment feature is disabled. BMC 260 may set the flag to one or true if the adaptive current adjustment feature is enabled. In one example, the adaptive current calibration adjustment feature may be disabled if a physical cover of the information handling system is removed or loose. If the adaptive current offset calibration feature is enabled, then a system power manager 265 may be configured to determine the voltage regulator offset, such as voltage regulator offset 230 and voltage regulator offset 240. In one embodiment, the adaptive current adjustment feature may be implemented in a system power manager 265. In particular, the adaptive current offset adjustment feature in system power manager 265 may be implemented in one or more processors of BMC 260. For example, system power manager 265 may be implemented in an advanced reduced instruction set architecture (RISC) machine (ARM) and co-processor subsystems of BMC 260.

The implementation of system power manager 265 in the ARM subsystem of BMC 260, also referred to herein as system power manager-ARM, may be configured to initialize the adaptive current calibration adjustment feature by reading or retrieving data associated with one or more attributes in BIOS 217 and a power budget table 280, which may be stored in a data store 275. The attributes may include an upper limit, such as an upper activity threshold, a lower limit, such as a lower activity threshold, analog power signal support flag, number of thermal sensors, the maximum number of available sensor fields, etc. The upper activity threshold and a lower activity threshold may be a percentage of the thermal design power of CPU 210. The system power manager-ARM may write the values of the attributes in a shared memory, which may be consumed by the implementation of system power manager 265 in the co-processor subsystem of BMC 260, also referred to as the system power manager-coprocessor. For example, the shared memory may be one of memories 205.

Further, system power manager-ARM may be configured to periodically perform a polling loop to read or receive telemetry data from one or more sensors or devices associated with determining a voltage regulator offset, such as a voltage regulator offset 230 and a voltage regulator offset 240. For example, system power manager-ARM may collect telemetry data from one or more thermal sensors. In another example, system power manager-ARM may collect CPU power consumption and/or CPU utilization data from CPU 210. The polling loop may be performed periodically which may be determined by an administrator or based on the type of the information handling system. For example, in monolithic and some modular systems, the polling loop may be performing every one hundred milliseconds. In other modular systems, the polling loop may be performed every twenty milliseconds.

The system power manager-coprocessor may be configured to determine a current offset for each of the sensors or devices based on the telemetry data. For example, a current offset may be determined for each thermal sensor of a plurality of thermal sensors. A thermal offset may be determined based on the current offsets. As used herein, a current offset refers to a current offset value that is calculated at a sensor or device level. A reference to the current offset calculated at the domain level may be based on the associated domain name. For example, given a plurality of thermal sensors, wherein a current offset is calculated for each thermal sensor, a thermal current offset may be based on the current offsets of the thermal sensors. The thermal current offset may be the lowest, average, or highest value of the current offsets of the thermal sensors.

The current offset calculated across domains and applied to the voltage regulator is referred to herein as a voltage regulator offset. For example, voltage regulator offset may be calculated based on a plurality of domain level current offsets, such as a thermal current offset, a power limit current offset and a CPU utilization current offset. The voltage regulator offset may be the lowest value, an average, or the highest value based on the aforementioned current offsets. The current voltage regulator offset may be compared to a previous voltage regulator offset stored in the shared memory. If there is a delta, then the previous voltage regulator offset may be updated by the current voltage regulator offset. Otherwise, the previous voltage regulator offset may be retained.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
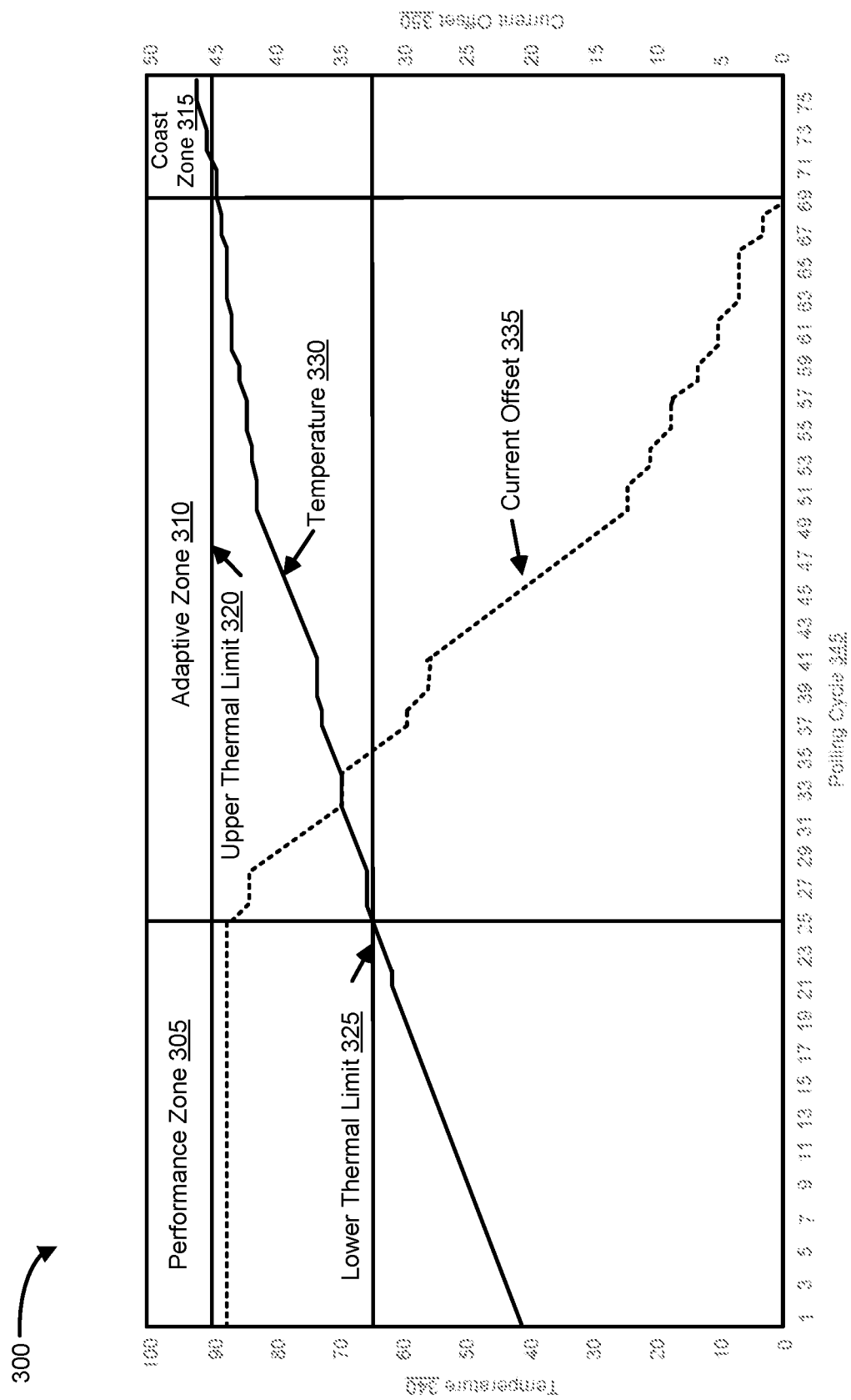
FIG. 3 is a graph illustrating an adaptive current monitor calibration adjustment response to an input from a single thermal sensor, according to an embodiment of the present disclosure.

FIG. 3 shows a graph 300 illustrating an adaptive current monitor calibration adjustment response to an input from a single thermal sensor. Graph 300 includes three zones: a performance zone 305, an adaptive zone 310, and a coast zone 315. Graph 300 also includes a polling cycle 345 for a horizontal axis, a temperature 340 for the left-hand side vertical axis, and a current offset 350 for the right-hand side vertical axis. In this example, the unit of measurement of temperature 340 is in degrees Celsius while the unit of measurement of the current offset is in amperes.

Graph 300 shows a relationship between temperature 330 of the thermal sensor and a current offset 335 at each polling cycle 345. In this example, the value of current offset 335 is in inverse proportion to the relative value of temperature 330. For example, as the value of temperature 330 approaches upper thermal limit 320, current offset 335 approaches a pre-determined minimum value. This relationship is evaluated every polling cycle. For example, at each polling cycle 345, temperature 330 of the thermal sensor is retrieved and the value of current offset 335 is calculated.

Each thermal sensor has an associated upper thermal limit 320 and a lower thermal limit 325. The value of current offset 335 may be based on the value of temperature 330 relative to the thermal limits and the different zones. In this example, temperature 330 is within performance zone 305 if it is less than lower thermal limit 325. Temperature 330 is within adaptive zone 310 if it is greater than lower thermal limit 325 and less than upper thermal limit 320. Temperature 330 is within coast zone 315 if it is greater than upper thermal limit 320.

When temperature 330 is at performance zone 305, the voltage regulator may under-report current at the processor by a certain maximum allowable percentage. For example, the voltage regulator may under-report the current by twenty percent. As such, at performance zone 305, the processor may operate at higher than the rated frequency as long as power and thermal thresholds are maintained. In some cases, the processor may be allowed to operate above the thermal design power of the processor. For example, Intel® has defined a dynamic power that allows the processor to draw power that is up to one hundred and twenty percent of the thermal design power for a particular period.

In this example, performance zone 305 may not be thermally restricted as the temperature is below lower thermal limit 325. As a result, current offset 335 can be set to the maximum value. As shown in graph 300, assuming that the processor-rated current capacity is two hundred twenty amperes, then current offset 335 is set to forty-four amperes which is twenty percent of the processor-rated current capacity. In summary, in this example, the current offset may be calculated as follows:

If (thermal sensor temperature <= lower thermal limit)
Current offset = maximum current offset
Else if (thermal sensor temperature >= upper thermal limit)
Current offset = 0
Else
Current Offset = (1 − (thermal sensor temperature − lower thermal limit) / (upper thermal limit − lower thermal limit))) * maximum current offset The maximum value of current offset 335 may have been pre-determined and stored in BIOS 217 or power budget table 280 of FIG. 2. After the current offset of the thermal sensors has been determined, a thermal current offset may be calculated. The value of the thermal current offset may be limited by the value of the most restrictive current offset per polling loop.

Temperature 330 is adaptive zone 310 when it is between lower thermal limit 325 and upper thermal limit 320. When temperature 330 is in adaptive zone 310, the voltage regulator may under-report the processor current by a percentage less than the maximum allowable percentage of the processor rated current capacity. For example, the voltage regulator may under-report the processor current by one percent to nineteen percent. Accordingly, current offset 335 may be adjusted between one percent and nineteen percent. When temperature 330 is in coast zone 315, the value of current offset 335 may be set to zero because temperature 330 is above upper thermal limit 320.

Figure 4:
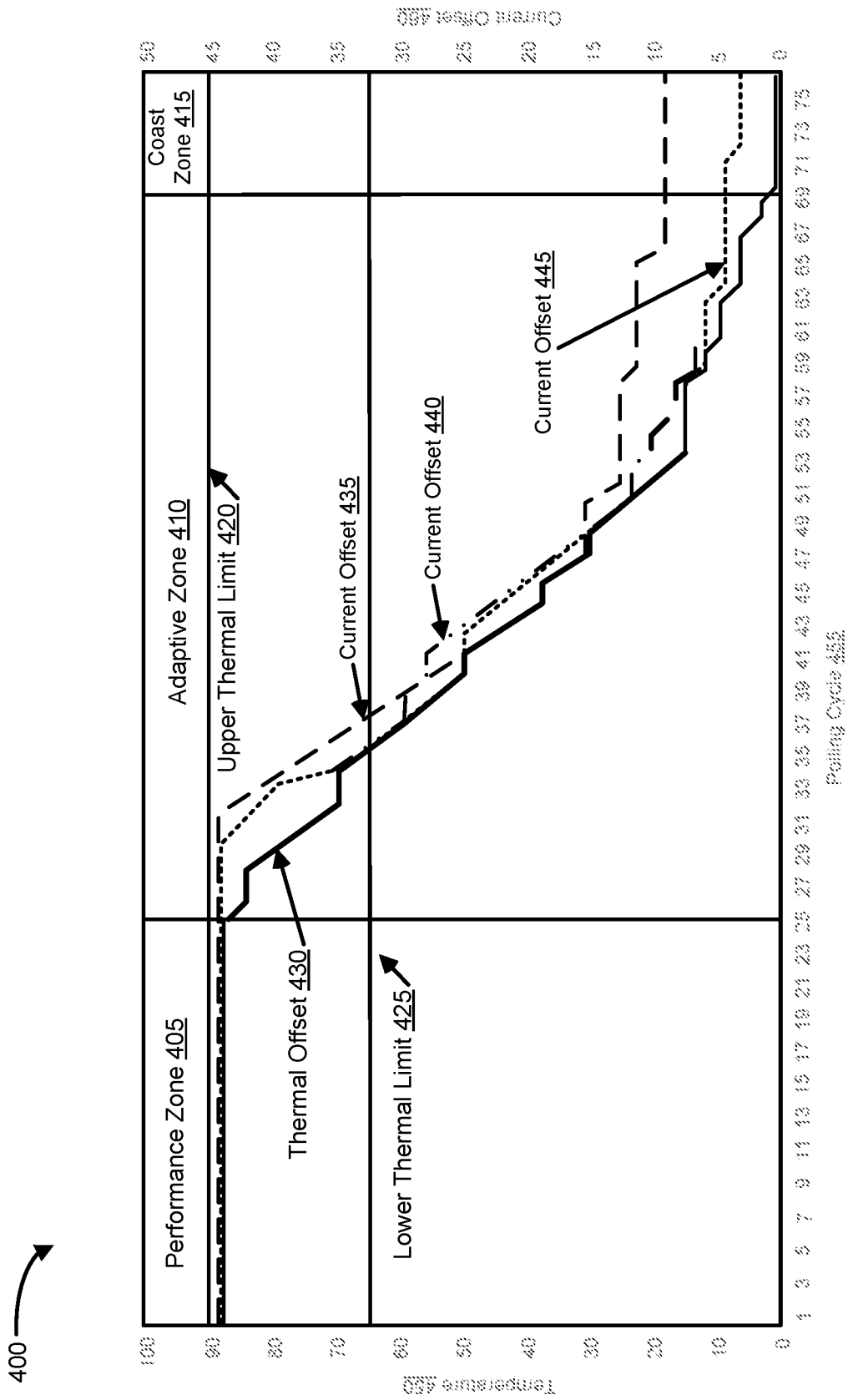
FIG. 4 is a graph illustrating a relationship between a thermal current offset and multiple current offsets, according to an embodiment of the present disclosure.

FIG. 4 shows a graph 400 illustrating the relationship of a thermal current offset to a plurality of current offsets. Graph 400 includes three zones: a performance zone 405, an adaptive zone 410, and a coast zone 415. Graph 400 also includes an upper thermal limit 420 and a lower thermal limit 425. Graph 400 further includes a polling cycle 455 for a horizontal axis, a temperature 450 for the left-hand side vertical axis, and a current offset 460 for the right-hand side vertical axis. In this example, the unit of measurement of temperature 450 is in degrees Celsius while the unit of measurement of the current offsets is in amperes.

Graph 400 shows a relationship between thermal offset 430 and the current offsets of the thermal sensors that include a current offset 435, a current offset 440, and a current offset 445. Thermal offset 430 and each of the current offsets may be calculated at each polling cycle 455. Thermal offset 430 may be determined based on the current offsets, wherein thermal offset 430 may be the lowest value among the current offsets as depicted in graph 400. Thermal offset 430 may be written in a shared memory to be consumed by the BMC.

Figure 5:
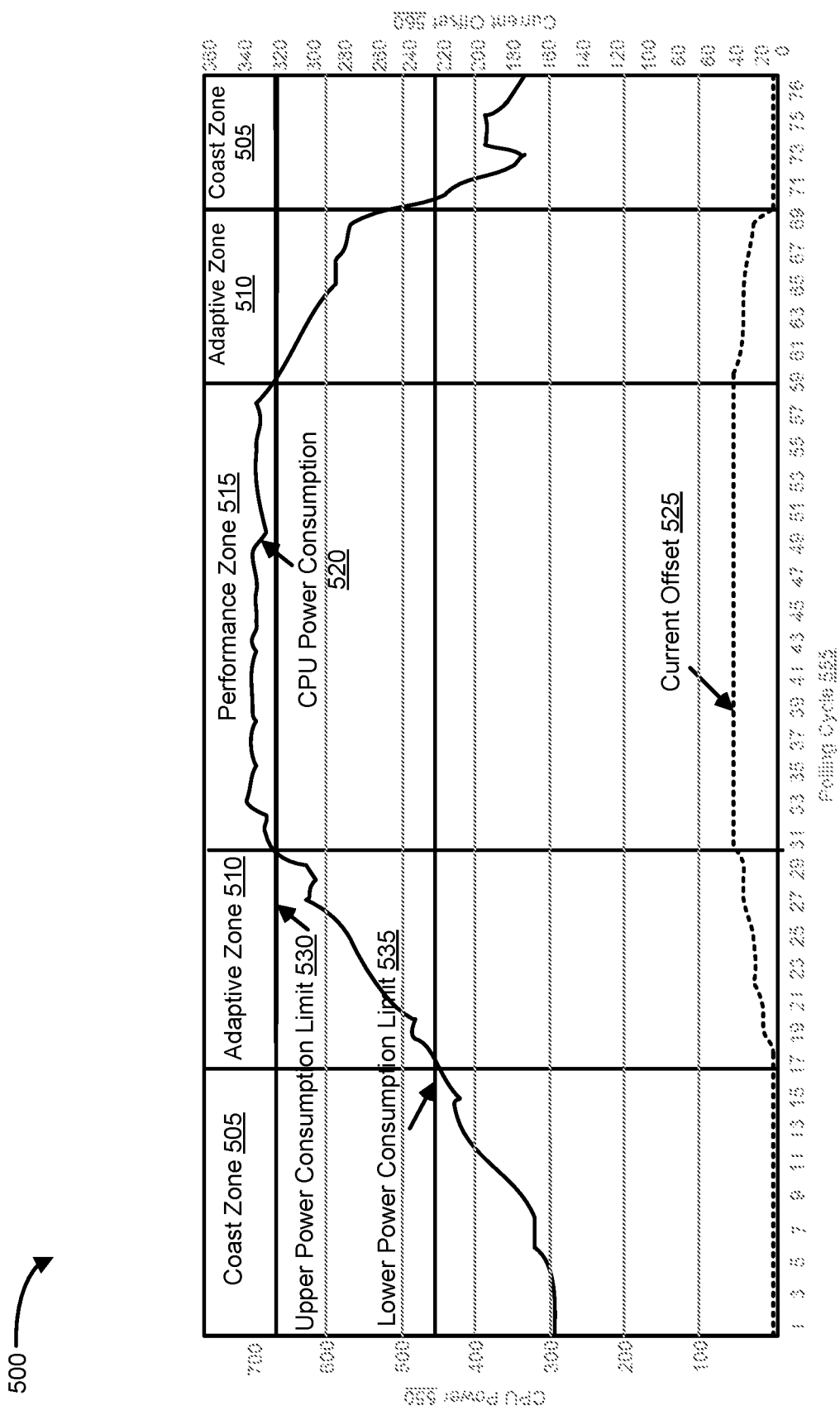
FIG. 5 is a graph illustrating an adaptive current monitor calibration adjustment response to CPU power consumption, according to an embodiment of the present disclosure.

FIG. 5 shows a graph 500 illustrating an adaptive current monitor calibration adjustment response to CPU power consumption. Graph 500 includes three zones: a performance zone 515, an adaptive zone 510, and a coast zone 505. Graph 500 also includes a polling cycle 555 for a horizontal axis, a CPU power 550 for the left-hand side vertical axis, and a current offset 560 for the right-hand side vertical axis. In this example, the unit of measurement of CPU power 550 is in watts while the unit of measurement of current offset 560 is in amperes.

Graph 500 shows a relationship between CPU power consumption 520 of a processor and a current offset 525 at each polling cycle 455. In this example, the value of current offset 525 is in proportion to the relative value of CPU power consumption 520. For example, as the value of CPU power consumption 520 approaches upper power consumption limit 530, the value of current offset 525 also increases. The value of the power consumption limits may be determined based on hardware protection policy and a user power cap. This relationship is evaluated every polling cycle. For example, at each polling cycle 455, CPU power consumption 520 is retrieved and the value of current offset 525 is calculated. The value of current offset 525 may be based on the value of CPU power consumption 520 relative to CPU power consumption limits and the different zones.

Each processor has an associated upper power consumption limit and lower power consumption limit, wherein each limit is a percentage of the thermal design power. The upper power consumption limit is also referred to as upper activity threshold. The lower power consumption limit is also referred to as lower activity threshold. In this example, the processor has an upper power consumption limit 530 and a lower power consumption limit 535. In this example, CPU power consumption 520 is within performance zone 515 if it is greater than upper power consumption limit 530. CPU power consumption 520 is within adaptive zone 510 is within adaptive zone 510 if it is greater than lower power consumption limit 535 and less than upper power consumption limit 530. CPU power consumption is within coast zone 505 if it is less than lower power consumption limit 535.

Current offset 525 may be determined based value of CPU power consumption 520 relative to the different zones, such as coast zone 505, adaptive zone 510, and performance zone 515. For example, current offset 525 may be set to twenty percent of the processor rated current when CPU power consumption is in performance zone 515. Current offset 525 may be set to less than the maximum allowable percentage, such as between one to nineteen percent of the processor rated current based on when the value of CPU power consumption 520 is in adaptive zone 510. Current offset 525 may be set to zero when CPU power consumption 520 is in coast zone 505.

Similar to temperature 330, in some cases, the processor may be allowed to operate above the upper power consumption limit 530, wherein the voltage regulator may under-report current at the processor by a certain maximum allowable percentage, such as twenty percent. Accordingly, current offset 525 may be set to the maximum value. As shown in graph 500, assuming that the processor-rated current capacity is two hundred twenty amperes, then current offset 525 is set to forty-four amperes which is twenty percent of the processor-rated current capacity. In summary, in this example, the current offset may be calculated as follows:

---

If CPU power consumption is >= than upper power consumption limit, then set current offset to maximum value
Else If CPU power consumption is <= lower power consumption limit, then set current offset to zero
Else
CPU power consumption is > than lower power consumption limit and < than the upper power consumption limit, then set the current offset to a proportional value between zero and (maximum value − one percent of CPU current limit)

---

The maximum value of current offset 525 may have been pre-determined and stored in a table similar to power budget table 280 of FIG. 2. For example, if the voltage regulator under-reports the processor current by twenty percent and the processor-rated current capacity is two hundred twenty amperes, then the maximum current offset value may be set to forty-four amperes which is twenty percent of the processor-rated current capacity. After the current offset for each processor has been determined, a CPU power consumption current offset may be calculated. The value of the CPU power consumption current offset may be limited by the value of the most restrictive current offset per polling loop.

Figure 6:
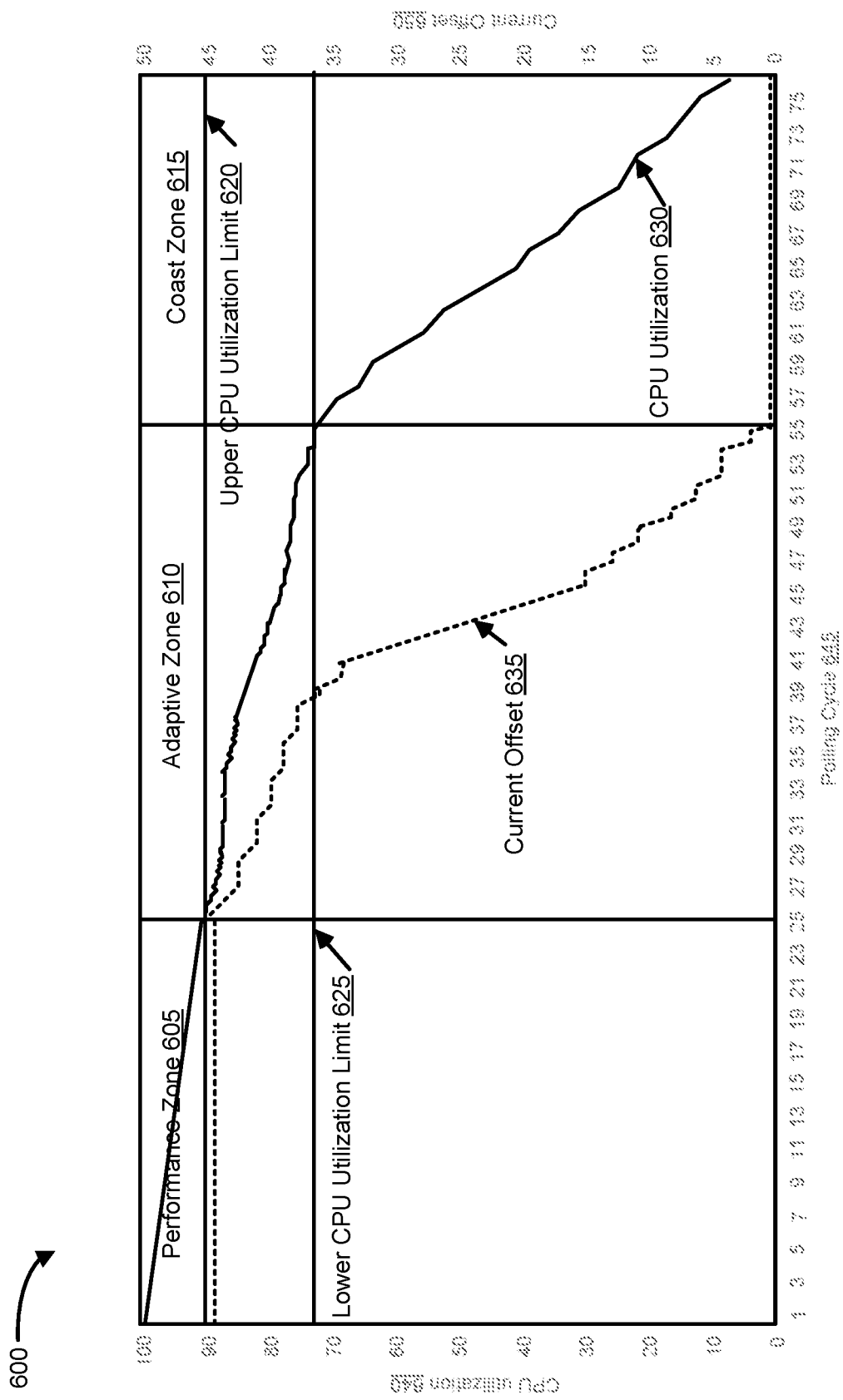
FIG. 6 is a graph illustrating an adaptive current monitor calibration adjustment response to CPU utilization, according to an embodiment of the present disclosure.

FIG. 6 shows a graph 600 illustrating an adaptive current monitor calibration adjustment response to CPU utilization. Graph 600 includes three zones: a performance zone 605, an adaptive zone 610, and a coast zone 615. Graph 600 also includes a polling cycle 645 for a horizontal axis, CPU utilization 640 for the left-hand side vertical axis, and a current offset 650 for the right-hand side vertical axis. In this example, the unit of measurement of CPU utilization 640 is in percentage while the unit of measurement of the current offset is in amperes.

Graph 600 shows a relationship between CPU utilization 630 of a processor of an information handling system and a current offset 635 at each polling cycle 645. In this example, the value of current offset 635 is in proportion to the relative value of CPU utilization 630. For example, as the value of CPU utilization 630 decreases, the value of current offset 635 decreases. This relationship is evaluated every polling cycle. For example, at each polling cycle 645, CPU utilization 630 may be retrieved and the value of current offset 635 calculated.

Each processor has an associated upper CPU utilization limit and CPU lower utilization limit, wherein each limit is a percentage of CPU utilization. The upper CPU utilization limit is also referred to as upper CPU utilization threshold. The CPU lower utilization limit is also referred to as the CPU lower utilization threshold. In this example, the processor has an upper CPU utilization limit 620 and a lower CPU utilization limit 625 which determines current offset 635. In this example, CPU utilization 630 is within performance zone 605 if it is greater than upper CPU utilization limit 620. CPU utilization 630 is within adaptive zone 610 is within adaptive zone 510 if it is greater than lower CPU utilization limit 625 and less than upper CPU utilization limit 620. CPU utilization is within coast zone 615 if it is less than lower CPU utilization limit 625.

Current offset 635 may be determined based value of CPU utilization 630 relative to the different zones, such as coast zone 615, adaptive zone 610, and performance zone 605. For example, current offset 635 may be set to twenty percent of the processor rated current when CPU utilization 630 is in performance zone 605. Current offset 525 may be set to less than the maximum allowable percentage, such as between one to nineteen percent of the processor rated current based on when the value of CPU utilization 630 is in adaptive zone 610. Current offset 635 may be set to zero when CPU utilization 630 in coast zone 615.

Similar to CPU power consumption 520, in some cases, the processor may be allowed to operate above the upper CPU utilization limit 620, wherein the voltage regulator may under-report current at the processor by a certain maximum allowable percentage, such as twenty percent. As such, current offset 635 may be set to the maximum value. As shown in graph 500, assuming that the processor-rated current capacity is two hundred twenty amperes, then current offset 635 is set to forty-four amperes which is twenty percent of the processor-rated current capacity. In summary, in this example, the current offset may be calculated as follows:

If CPU Utilization >= Upper CPU utilization limit
   Current offset = Maximum value
Else if CPU Utilization <= upper CPU utilization limit and >= than lower CPU utilization limit
   Current offset = proportional value between one percent of CPU current rating and (maximum value − one percent of CPU current rating)
Else CPU utilization < lower CPU utilization limit
   Current offset = zero The maximum value of current offset 635 or the maximum percentage of the CPU current rating may have been pre-determined and stored in a table similar to power budget table 280 of FIG. 2. For example, if the voltage regulator under-reports the processor current by twenty percent, then the maximum current offset percentage may be twenty percent of the processor rated current capacity. Similar to FIG. 5 if the processor-rated current capacity is two hundred twenty amperes and the maximum current percentage is twenty percent, then current offset 635 is equal to forty-four amperes which is twenty percent of the processor-rated current capacity. After the current offset for each processor has been determined, a CPU power consumption current offset may be calculated. The value of the CPU power consumption current offset may be limited by the value of the most restrictive current offset per polling loop.

Figure 7:
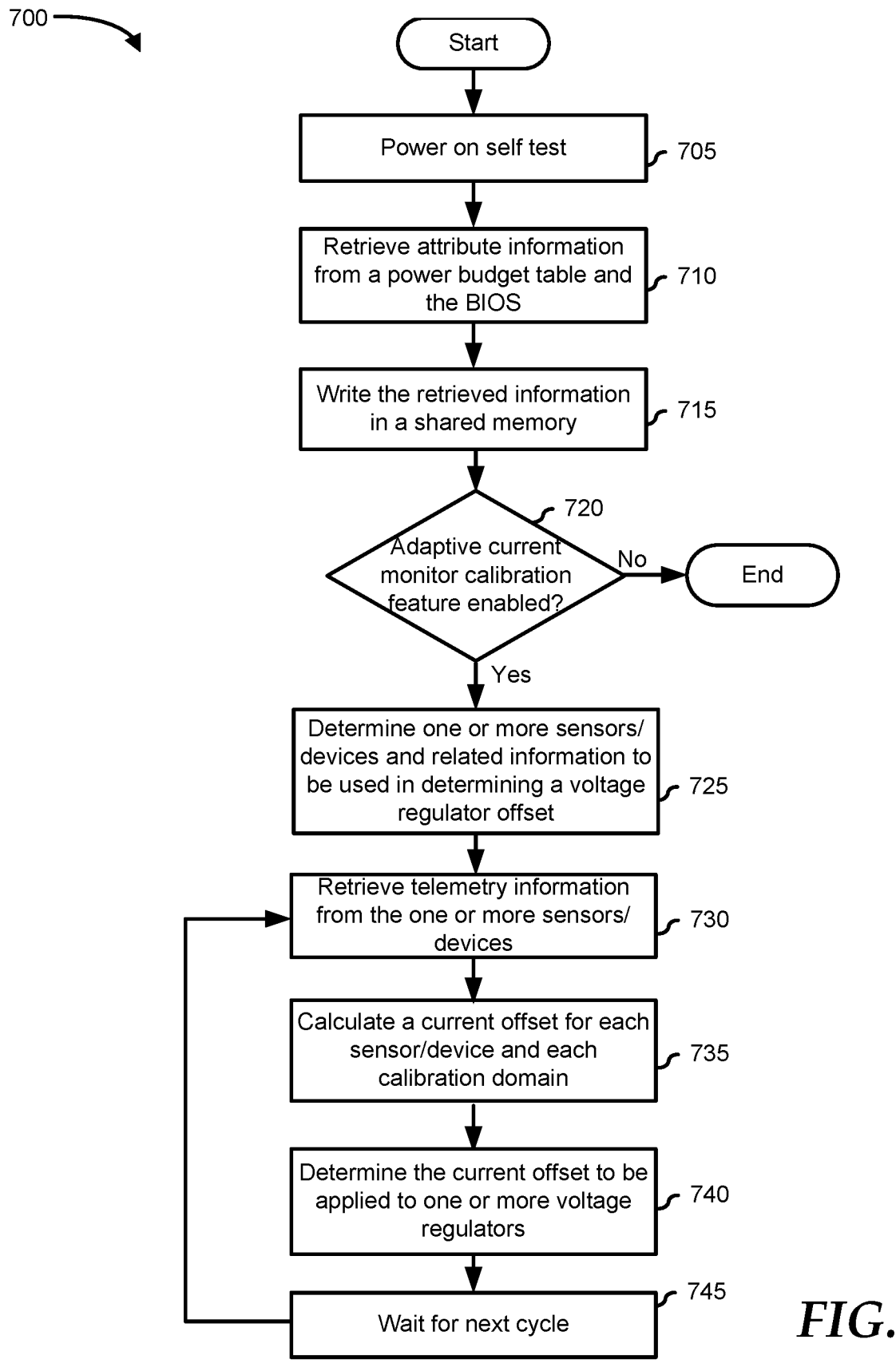
FIG. 7 is a flowchart of a method for an adaptive current monitor calibration adjustment response, according to an embodiment of the present disclosure.

FIG. 7 shows a flowchart of a method 700 for adaptive current monitor calibration adjustment. Method 700 may be performed by one or more components of system 200 of FIG. 2. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 700 typically starts at block 705 when an information handling system boots and performs a power-on self-test. At block 710, the method retrieves information of one or more attributes from a power budget table and the BIOS. At block 715, the method may save this information in shared memory.

At decision block 720, the method may determine whether the adaptive current monitor calibration feature is enabled. The method may check a flag associated with enabling the said feature. For example, if the flag is set to one or true, then the adaptive current monitor calibration feature is enabled. If the flag is set to zero or false, then the adaptive current monitor calibration feature is not enabled. If the adaptive current monitor calibration feature is not enabled, then the "NO" branch is taken, and the method ends. If the adaptive current monitor calibration feature is enabled, then the "YES" branch is taken, and the method proceeds to block 725.

At block 725, the method may identify one or more sensors or devices and associated information that is related to each of the domains of the adaptive current monitor calibration feature. For example, the method may read the shared memory to retrieve a list of sensors to use in identifying the sensors or devices, their locations, and limits. The method may build a data structure to store the information associated with one or more sensors or devices. There may be a data structure for each set of sensors or devices, wherein each set may be associated with a domain in determining the current offset associated with that factor. For example, a set of thermal sensors may be used to determine the thermal current offset.

At block 730, the method may retrieve telemetry information from the sensors or devices and store the telemetry information in the shared memory. The method may loop through the list of the sensors or devices in gathering the telemetry information and store the information in the data structure. For example, the data structure above may be populated by the temperature retrieved from the sensor. At block 735, the method may calculate the current offset for each sensor or device. The method may also calculate the current offset associated with each calibration domain, also referred to as domain current offset, based on the current offsets respective to the set of sensors or devices. For simplicity, the calibration domain may also be referred to simply as a domain in the present disclosure.

The calibration domains may include thermal limits, power consumption, CPU utilization, current limits, energy limits, performance per watt, power usage effectiveness, acoustic limits, input voltage, and correctible error. For example, the method may determine the thermal current offset, the power consumption current offset, the CPU utilization voltage regulator offset, acoustic current offset, performance per watt current offset, power usage effectiveness current offset, etc. A different algorithm may be used for calculating each current offset for a particular calibration domain. However, calculating the current offset for a first domain may be similar to calculating the current offset for a second domain. For example, calculating the current offset for the current limit and energy limit domains may be similar to calculating the current offset for the power consumption domain. For the performance per watt domain, the method may monitor the performance metric/power metric for the CPU and the current offset may be set to zero if the performance per watt drops out of a maximum efficiency range. The maximum efficiency range may be stored in a power budget table.

For the power usage effectiveness domain, the method may monitor power losses due to one or more inefficiencies and total input power. The inefficiencies may include fan power, voltage regulator efficiency changes, power supply unit efficiency changes, etc. The power usage effective may be equal to the total input power/(total input power−inefficiencies power). The current offset for this domain may be set to zero if the power usage effectiveness drops out of a maximum efficiency range which may be stored in a power budget table. For the acoustics domain, the method may monitor fan speed and set the current offset to zero when an acoustic limit is reached. The method may also monitor sound waves and adjust the current offset based on the acoustic limit.

For the input voltage domain, the calculation of the current offset may be similar to the calculation of the current offset for the current limits domain. In one embodiment, the method may monitor the input voltage and if a drop in the input voltage is detected according to one or more limits, then the current offset may be adjusted accordingly. For example, if a brownout is detected, then the current offset may be set to zero. For the correctible errors domain, the method may monitor the frequency of the shift in the correctible errors. If there is a shift in the frequency of the correctible errors, then the current offset may be set to zero to improve resiliency. In determining the current offset associated with each domain, the method may calculate the current offset for each of a plurality of thermal sensors. Based on the current offset, the method may determine a thermal current offset. For example, the thermal current offset may be the one with the lowest value among the current offsets of the thermal sensors.

At block 740, the method may determine the voltage regulator offset based on the current offsets associated with the different domains. For example, the voltage regulator offset may be based on the thermal current offset, the power capacity current offset, and the CPU utilization current offset. In one embodiment, the voltage regulator offset may be the one with the lowest value among the aforementioned current offsets. The voltage regulator offset may the current offset to be applied to one or more voltage regulators to adjust the power reported by the voltage regulators (written over SVID, PMBus, etc.).

The voltage regulator offset may be referred to as a current voltage regulator offset and compared to a previous voltage regulator offset determined at the previous polling cycle that may also be stored in the shared memory. The method may determine whether to update the previous voltage regulator offset stored in the shared memory with the current voltage regulator offset. In one example, the method may update the previous voltage regulator offset with the current voltage regulator offset if the value of the current voltage regulator offset is smaller than the value of the previous voltage regulator offset. The voltage regulator offset may be multiplied by "−1" before writing the offset to the shared memory.

If the method determines to update the previous voltage regulator offset, then the method may overwrite the previous voltage regulator offset with the current voltage regulator offset. Otherwise, the previous voltage regulator offset remains stored in the shared memory and accessible by the BMC. The voltage regulator offset in the shared memory may be applied to one or more voltage regulators.

In one embodiment, each of the domain current offsets may also be compared with the corresponding domain current offset stored in the shared memory, which may also be referred to as a previous domain current offset. An algorithm to update the previous domain current offset in the shared memory may be similar to the algorithm to update the voltage regulator offset stored in the shared memory. As such, the determination of the voltage regulator offset may be based on the updated domain current offsets in the shared memory. At block 745, the method waits for the next polling cycle. The polling cycle maybe every one hundred milliseconds, twenty milliseconds, etc. according to a predetermined period. The polling cycle may be based on the type of information handling system.

Although FIG. 7 shows example blocks of method 700 in some implementation, method 700 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 700 may be performed in parallel. For example, blocks 735 and 740 of method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an ASIC, a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   polling, by a processor, telemetry data from a plurality of sensors associated with a central processing unit;
   determining current offsets for each one of the sensors based on the telemetry data, wherein the sensors are associated with a calibration domain;
   determining a domain current offset associated with the calibration domain, wherein the domain current offset is based on the current offsets;
   determining a voltage regulator offset based on the domain current offset, wherein the voltage regulator offset is to be applied to a voltage regulator; and
   adjusting power provided by the voltage regulator to the central processing unit based on the voltage regulator offset.

2. The method of claim 1, further comprising comparing the voltage regulator offset with a previous voltage regulator offset stored in a memory.

3. The method of claim 2, further comprising updating the previous voltage regulator offset stored in the memory with the voltage regulator offset when the voltage regulator offset is less than the previous voltage regulator offset.

4. The method of claim 1, wherein the calibration domain is associated with thermal design power.

5. The method of claim 1, wherein the calibration domain is associated with central processing unit utilization.

6. The method of claim 1, wherein the calibration domain is associated with central processing unit power consumption.

7. The method of claim 1, wherein the calibration domain is associated with an upper limit and a lower limit.

8. The method of claim 1, wherein the determining of the current offsets is performed at each polling cycle.

9. The method of claim 1, wherein the determining of the current offsets is based on a plurality of zones across the calibration domain.

10. The method of claim 9, wherein the zones are based on thermal design power of the central processing unit.

11. An information handling system, comprising:
    a processor; and
    a memory device storing code that when executed causes the processor to perform operations, the operations including:
       polling telemetry data from a plurality of sensors associated with a central processing unit;
       determining current offsets for each one of the sensors based on the telemetry data, wherein the sensors are associated with a calibration domain;
       determining a domain current offset associated with the calibration domain, wherein the domain current offset is based on the current offsets;
       determining a voltage regulator offset based on the domain current offset, wherein the voltage regulator offset is to be applied to a voltage regulator; and
       adjusting power provided by the voltage regulator to the central processing unit based on the voltage regulator offset.

12. The information handling system of claim 11, wherein the calibration domain is associated with thermal design power of the central processing unit.

13. The information handling system of claim 11, wherein the calibration domain is associated with central processing unit utilization.

14. The information handling system of claim 11, wherein the calibration domain is associated with an upper limit and a lower limit.

15. The information handling system of claim 11, wherein the determining of the current offsets is performed at each polling cycle.

16. The information handling system of claim 11, wherein the determining of the current offsets is based on a plurality of zones across the calibration domain.

17. A non-transitory computer-readable medium to store instructions that are executable to perform operations comprising:
    polling telemetry data from a plurality of sensors associated with a central processing unit;
    calculating current offsets for each one of the sensors based on the telemetry data, wherein the sensors are associated with a calibration domain;
    calculating a domain current offset associated with the calibration domain, wherein the domain current offset is based on the current offsets;
    determining a voltage regulator offset based on the domain current offset, wherein the voltage regulator offset is to be applied to a voltage regulator; and
    adjusting power provided by the voltage regulator to the central processing unit based on the voltage regulator offset.

18. The non-transitory computer-readable medium of claim 17, wherein the calibration domain is associated with thermal design power of the central processing unit.

19. The non-transitory computer-readable medium of claim 17, wherein the calibration domain is associated with central processing unit utilization.

20. The non-transitory computer-readable medium of claim 17, wherein the calibration domain is associated with an upper limit and a lower limit.

* * * * *